United States Patent [19]

Mülhaupt et al.

[11] Patent Number: 4,713,428

[45] Date of Patent: Dec. 15, 1987

[54] BRANCHED POLYESTERS

[75] Inventors: Rolf Mülhaupt, Marly; Alfred Renner, Muntelier; Horst Lauterbach, Therwil, all of Switzerland

[73] Assignee: Ciba-Geigy Corporation, Ardsley, N.Y.

[21] Appl. No.: 907,253

[22] Filed: Sep. 12, 1986

[30] Foreign Application Priority Data

Sep. 16, 1985 [CH] Switzerland .......................... 4011/85
Mar. 3, 1986 [CH] Switzerland ............................ 846/86

[51] Int. Cl.$^4$ .................... C08F 283/00; C08G 59/14; C08G 69/44
[52] U.S. Cl. .................................. 525/523; 525/186; 525/474; 525/533; 528/272; 528/289
[58] Field of Search ............... 525/186, 474, 523, 533; 528/272, 289

[56] References Cited

U.S. PATENT DOCUMENTS 3,047,531 7/1962 D'Alello ............................. 525/45
3,050,496 8/1962 D'Alello ............................. 525/45

(List continued on next page.)

FOREIGN PATENT DOCUMENTS 0087098 3/1983 European Pat. Off. .

OTHER PUBLICATIONS

Chem. Abstr., 87, 85289y, (1977).

Primary Examiner—Lucille M. Phynes
Attorney, Agent, or Firm—Luther A. R. Hall

[57] ABSTRACT

The invention relates to compounds with structures of the formulae I to IV

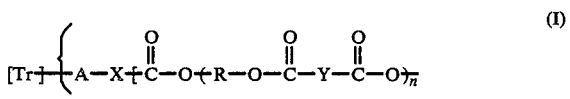 (I)

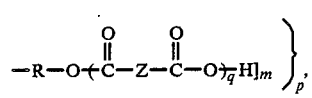

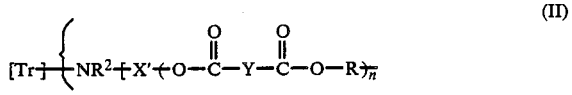

(II)

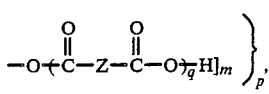

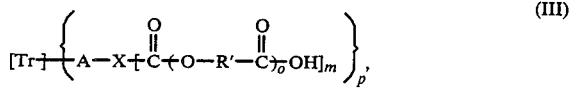

(III)

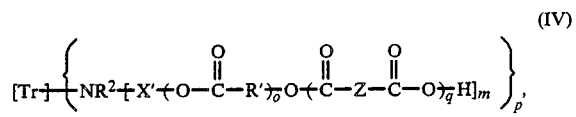

(IV)

in which formulae
Tr is a radical of formula V or VI

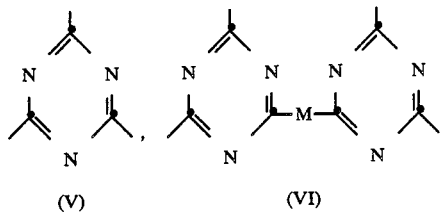

(V)    (VI)

A is —O— or —NR$^1$—, R$^1$ is hydrogen or a monovalent organic radical,

X is a di- or trifunctional radical of a hydroxycarboxylic or amino-carboxylic acid after removal of the functional groups, R$^2$, if m is 1, has one of the meanings of R$^1$, or R$^2$, if m is 2, is a free electron pair, R is the radical of a diol after removal of the two hydroxyl groups, Y is the radical of a dicarboxylic acid after removal of the two carboxyl groups, Z has one of the meanings of Y, but may additionally also carry carboxylic acid or sulfonic acid radicals as substituents, R' is the divalent radical of a hydroxycarboxylic acid after removal of the carboxyl group and the hydroxyl group, X' is the divalent radical of an aminoalcohol after removal of the amino and the hydroxyl group, n is an integer from 0 to 40, o is an interior from 1 to 40, m is 1 or 2, q is 0 or 1 and p, independently of the radical Tr, is 3 or 4, M is a radical —W—Q—W—, wherein W is —O—, —NR$^1$— or —NR$^1$—X''—NR$^1$—OC—, X'' is the divalent radical of a diamine after removal of the amino groups, and Q is a divalent oligomer radical containing 1 to 60 monomer units, which radical is selected from the group consisting of 1,2-polybutadiene, 1,4-polybutadiene, acrylonitrile/butadiene copolymers, polyethers or polydialkylsiloxanes, with the proviso that the compounds may not have a melting point above 200° C.

These compounds can be used as components of hot melt adhesives or as epoxide hardeners. The carboxyl-terminated compounds can also be used as components of powder coating compositions.

20 Claims, No Drawings

U.S. PATENT DOCUMENTS

| | | | |
|---|---|---|---|
| 3,053,796 | 9/1962 | D'Alello | 525/45 |
| 3,056,760 | 10/1962 | D'Alello | 525/45 |
| 3,062,774 | 11/1962 | D'Alello | 525/45 |
| 3,397,254 | 8/1968 | Wynstra et al. | 525/438 |
| 3,573,301 | 3/1971 | Winter | 544/196 |
| 3,709,884 | 1/1973 | Dexter et al. | 544/197 |
| 3,772,250 | 11/1973 | Economy et al. | 528/208 |
| 3,816,417 | 6/1974 | Economy et al. | 544/219 |
| 3,857,814 | 12/1974 | Economy et al. | 528/208 |
| 3,962,314 | 6/1976 | Economy et al. | 560/66 |
| 4,034,018 | 7/1977 | Habermeier | 528/289 |
| 4,139,512 | 2/1979 | Buxbaum | 528/184 |
| 4,147,737 | 4/1979 | Sein et al. | 525/438 |
| 4,219,638 | 8/1980 | Waddill et al. | 525/523 X |
| 4,281,103 | 7/1981 | Kainmüller et al. | 528/289 |
| 4,331,586 | 5/1982 | Hardy | 525/186 |
| 4,402,907 | 9/1983 | Clark | 522/7 |
| 4,409,348 | 10/1983 | Wiezer et al. | 525/186 X |
| 4,547,548 | 10/1985 | Cantatore | 525/186 |

BRANCHED POLYESTERS

The present invention relates to novel stelliformly branched polyesters, to compositions containing these compounds and resins which can be cured by carboxyl- or hydroxyl-terminated polyesters, to a process for the preparation of these polyesters, and also to the use thereof as components of adhesives, varnishes or surface coatings for corrosion prevention.

Carboxyl-terminated polyesters may also be used as components in powder coating compositions. Such polyesters are usually compounds with a linear polymeric structure which exhibit a certain amount of solubility in organic solvents.

If, in addition to difunctional monomers the polymerization mixtures also contain larger proportions of tri- or polyfunctional monomer compomponents, then cross-linked structures form which are either only restrictedly swellable or are completely insoluble. As a rule, such products can not be employed for the above-mentioned purposes.

Branched aromatic polyesters are known from German Offenlegungsschrift No. 2 157 696. These compounds contain a central trifunctional triazine nucleus and three essentially aromatic polyester chain starting from said nucleus. These compounds are suitable for use as thermoplastic moulding materials with excellent high temperature properties. Since these compounds do not have the necessary flexibility and solubility, they are not suitable for use in powder coating compositions or as hardeners for e.g. epoxy resins; furthermore, they have to be processed at high temperatures, which means that frequently the curing process can not be adequately controlled.

Moreover, 1,3,5-trianilino-s-triazines which are used as light stabilisers in plastics, dyes and, in particular, in cosmetic preparations are known from published European patent application No. 87 098. A hydroxyl-terminated derivative which does not melt below 200° C. is described in said application (Example 7).

The present invention relates to compounds of formulae I, II, III and IV

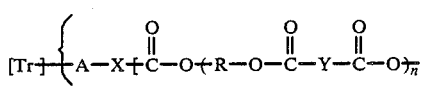
(I)

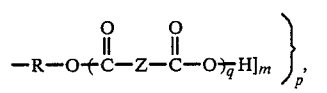

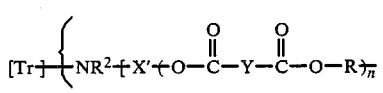
(II)

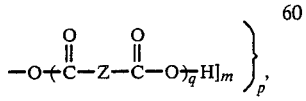

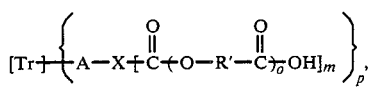
(III)

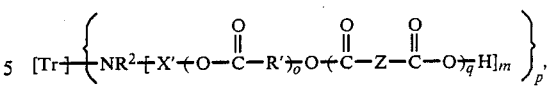
(IV)

in which formulae
Tr is a radical of formula V or VI

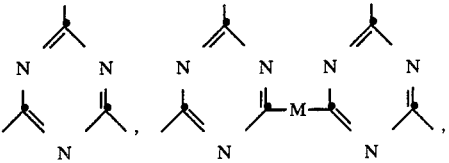

A is —O— or —NR$^1$—, R$^1$ is hydrogen, unsubstituted or substituted C$_1$-C$_{20}$alkyl, C$_5$-C$_9$cycloalkyl, unsubstituted or substituted phenyl or C$_7$-C$_9$aralkyl, X is a di- or trifunctional radical of a hydroxycarboxylic or aminocarboxylic acid after removal of the functional groups, or A and X together are the radical of a heterocyclic aminocarboxylic acid after removal of the carboxylic group, which radical is attached to the radical Tr through the nitrogen atom, R$^2$, if m is 1, has one of the meanings of R$^1$, or R$^2$, if m is 2, is a free electron pair, R is the radical of an aliphatic, cycloaliphatic, aromatic, araliphatic or heterocyclic diol after removal of the two hydroxyl groups, which radical may carry substituents containing no active hydrogen atoms, Y is the radical of an aliphatic, cycloaliphatic, aromatic, araliphatic or heterocyclic dicarboxylic acid after removal of the two carboxyl groups, which radical may carry substituents containing no active hydrogen atoms, Z has one of the meanings of Y, but may additionally also carry carboxylic acid or sulfonic acid radicals as substituents, R' is the divalent radical of an aliphatic, cycloaliphatic, aromatic or araliphatic hydroxycarboxylic acid after removal of the carboxyl group and the hydroxyl group, X' is the di- or trivalent radical of an aliphatic, cycloaliphatic, aromatic or araliphatic aminoalcohol after removal of the amino and the hydroxyl group or groups, n is an integer from 0 to 40, o is an integer from 1 to 40, m is 1 or 2, q is 0 or 1 and p, dependent on the radical Tr, is 3 or 4, M is a radical —W—Q—W—, wherein
W is —O—, —NR$^1$— or —NR$^1$—X"—NR$^1$—OC—, X" is the divalent radical of an aliphatic, cycloaliphatic, aromatic or araliphatic diamine after removal of the amino groups, and Q is a divalent oligomer radical containing 1 to 60, preferably 5 to 40, monomer units, which radical is selected from the group consisting of 1,2-polybutadiene, 1,4-polybutadiene, acrylonitrile/butadiene copolymers, polyethers or polydialkylsiloxanes, with the proviso that if Tr is a radical of formula V, the groups R and R' may only be aliphatic or cycloaliphatic radicals, and that the compounds do not have a melting point above 200° C. and that at least one of n and q in formula II is greater than 0.

$R^1$ and $R^2$ as $C_1$–$C_{20}$alkyl are a radical containing a straight or branched, preferably straight, alkyl chain. Examples of such radicals are methyl, ethyl, n-propyl, isopropyl, n-butyl, sec-butyl, pentyl, hexyl, octyl, decyl, dodecyl, tetradecyl, hexadecyl, octadecyl or eicosyl. 2-Ethylhexyl is also a possible branched radical. $R^1$ or $R^2$ may also be substituted alkyl. Examples of substituents are $C_1$–$C_4$alkoxy, halogen, in particular chlorine or bromine, or cyano.

$R^1$ and $R^2$ as alkyl are preferably $C_1$–$C_4$alkyl, most preferably methyl.

$R^1$ and $R^2$ as substituted phenyl are for example chlorophenyl, alkylphenyl or alkoxyphenyl. Examples of such groups are 2-, 3- or 4-methylphenyl, 2, 3- or 4-methoxyphenyl or 4-chlorophenyl.

$R^1$ and $R^2$ as $C_5$–$C_9$cycloalkyl are for example cyclopentyl, cyclohexyl, cycloheptyl, cyclooctyl or cyclononyl, with cyclohexyl being particularly preferred. These cycloalkyl radicals may also be alkyl-substituted.

$R^1$ and $R^2$ as $C_7$–$C_9$aralkyl are for example benzyl, α-methylbenzyl or α,α-dimethylbenzyl, with benzyl being preferred.

$R^1$ and $R^2$ are preferably hydrogen or methyl, most preferably hydrogen.

If X' is a trivalent radical of an aminoalcohol (m=2), then $R^2$ must be a free electron pair.

X as a difunctional radical of an aminocarboxylic acid is derived for example from α-amino acids such as glycine, alanine or phenylalanine (in this case X is therefore —$CH_2$—, —$CH(CH_3)$— or —$CH[$—$CH_2$—$C_6H_5]$—) or from α,ω-amino acids such as β-alinine, aminocaproic acid, γ-aminobutyric acid, p-aminobenzoic acid or o-anthranilic acid.

If A and X together form the radical of a heterocyclic aminocarboxylic acid, then said acid is derived for example from proline or pyroaspartic acid. Thus A and X in this case form radicals of the formulae

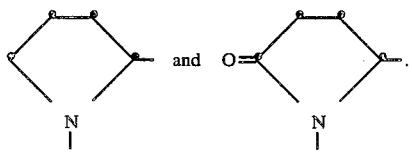

X as a difunctional radical of a hydroxycarboxylic acid is derived for example from α,ω-hydroxycarboxylic acids such as lactic acid, γ-hydroxybutyric acid, salicylic acid or p-hydroxybenzoic acid (in this case X is therefore —$CH(CH_3)$—, —$(CH_2)_3$—, o—$C_6H_4$, p—$C_6H_4$).

If X is a trifunctional radical of an aminocarboxylic or hydroxycarboxylic acid, then said radical is derived for example from aspartic acid, 3- or 4-aminophthalic acid or from 3- or 4-hydroxyphthalic acid.

X is preferably $C_2$–$C_{20}$alkylene which may carry $C_1$–$C_4$alkyl, $C_1$–$C_4$alkoxy or halogen as substituents and which may contain ethylenically unsaturated carbon atoms, X as unsubstituted saturated alkylene is for example ethylene or tri-, tetra-, penta-, hexa-, hepta-, octa-, deca-, dodeca-, tetradeca-, hexadeca-, octadeca- or eicosamethylene.

If X is substituted, then examples of $C_1$–$C_4$alkyl substituents are methyl, ethyl, n-propyl, isopropyl or n-butyl, with methyl being preferred; examples of $C_1$–$C_4$alkoxy substituents are methoxy, ethoxy, n-propoxy, isopropoxy or n-butoxy, with methoxy being preferred; and examples of halogen substituents are chlorine or bromine, with chlorine being preferred.

X is preferably unsubstituted $C_5$–$C_{12}$alkylene and most preferably penta- or dodecamethylene.

If R is derived from an aliphatic diol, then R is an unsubstituted or substituted straight chain or branched alkylene radical which may be interrupted by oxygen or sulfur atoms or which may contain ethylenically unsaturated bonds. Unsubstituted saturated straight chain $C_2$–$C_{20}$alkylene radicals such as those listed above as examples of X are preferred.

Particularly preferred radicals R are $C_2$–$C_{12}$alkylene radicals, e.g. ethylene, tetramethylene, hexamethylene or dodecamethylene.

The diol on which the radical R is based may also be a poly(oxyalkylene)glycol or poly(thioalkylene)glycol, the oxygen-containing derivatives being preferred, e.g. poly(ethylene)glycol, poly(propylene)glycol or poly(butylene)glycol containing 2 to 60, preferably 20 to 40, monomer units. If R is derived from a cycloaliphatic diol, then said diol is for example one which contains a cycloalphatic ring of 5 to 7 carbon atoms and which may be part of an aliphatic chain or may carry substituents directly at the ring. Examples of radicals of this type are cyclopentylene, cyclohexylene or cycloheptylene. Cyclohexylene is particularly preferred, especially 1,3- or 1,4-cyclohexylene. 1,4-Bis(cyclohexylene)methylene is also of interest.

If R is derived from an aliphatic diol containing ethylenically unsaturated bonds in the chain, then said diol is a derivative of a hydroxyl-terminated polybutadiene, i.e. a 1,2- or 1,4-polybutadiene or a butadiene/acrylonitrile copolymer. Such derivates contain 1 to 60, preferably 20 to 40, monomer units in the chain.

If R is based on an aromatic diol, then said radical is preferably derived from a mono- or dinuclear phenol and is therefore in particular 1,2-, 1,3- or 1,4-phenylene or 4,4'-diphenylmethane, 4,4'-diphenyl ether or 4,4'-diphenylsulfone. R as an araliphatic radical is for example xylylene.

R as a heterocyclic radical is derived for example from furan, pyrane or pyridine or from a fully or partially hydrogenated derivative thereof, preferably from tetrahydrofuran.

Preferably, R is derived from an aliphatic or cycloaliphatic diol. R is most preferably the radical of a poly(butylene)glycol, in particular a radical containing 9, 12 or 30 (=mean values) oxybutylene units in the chain.

The radicals Y and Z usually correspond to those radicals defined above for R. However, they are derived from dicarboxylic acids instead of from diols. For a concrete compound of formula I, R, Y and Z may have different meanings within the scope of the definitions given.

All three types of radicals R, Y and Z may carry substituents containing no active hydrogen atoms.

Such radicals are for example selected from the group consisting of alkyl, in particular methyl, alkoxy, in particular methoxy, halogen, in particular chlorine, cyano, alkoxycarbonyl, in particular methoxycarbonyl, or vinyl.

If Z carries substituents containing active hydrogen atoms, then such substituents are carboxylic acid or sulfonic acid groups, preferably carboxylic acid groups.

It is particularly preferable for the radicals Y and Z to be derived from aromatic or heterocyclic dicarboxylic acids. Z is in particular a derivative of trimellitic acid.

R' is derived from a hydroxycarboxylic acid, whereas R is based on a diol. The group R' remaining after removal of the functional radicals may have the same meanings and preferences as the radical R remaining after removal of the two functional hydroxyl groups of the diol.

The radical X' is derived from an aminoalcohol containing not more than one amino group, whereas the radical X is derived from an aminocarboxylic or hydroxycarboxylic acid. The group X remaining after removal of the respective functional groups has the same meanings and preferences as the group X' remaining after removal of the functional groups.

The index n describes the length of the polyester chain of the triazine derivatives of formulae I and II. Said index may have values in the range from 0 to 40, preferably from 0 to 25, most preferably from 0 to 10.

The index o describes the length of the polyester chain of the triazine derivatives of formulae III or IV of this invention. Said index may have values in the range from 1 to 40, preferably from 1 to 25, most preferably from 1 to 10.

The index q determines whether the polyester is carboxyl- or hydroxy-terminated. Said index may have a value of either 0 (hydroxyl-terminated) or 1 (carboxyl-terminated).

Depending on the functionality of the radical X or X', the index m is 1 or 2. Preferably, m is 1.

Depending on whether Tr is a trivalent triazine radical of formula V or a tetravalent triazine radical of formula VI, the index p is 3 or 4. Preferably, p is 3.

The polyesters of formulae I to IV must have a certain minimum flexibility and, if they are crystalline, must have a melting point of less than 200° C. This is usually achieved if the polyester chains only partly consist of aromatic components or if triazine radicals of formula VI containing flexibilising bridges M as central groups are employed. In the latter case, the polymer chains at the remaining four valences of the component of formula VI may consist entirely of aromatic radicals. The bridge member M in formula VI is a segment which is derived from oligomeric butadienes, acrylonitrile/butadiene copolymers, polyethers or dialkylsiloxanes. These oligomers contain from 1 to 60 monomer units, preferably from 5 to 40 such units. The oligomers are attached to the triazine nuclei through —O— or —NR$^1$— bridges, preferably —NH— bridges.

Such segments are introduced via the corresponding dihydroxyl- or diamino-terminated oligomers; however, they may also be introduced via the corresponding dicarboxyl-terminated oligomers which are converted by reaction with a diamine into the corresponding difunctional aminoamide acids.

Examples of suitable acrylonitrile/butadiene copolymer components are products of the type HYCAR ®, manufactured by the company Goodrich.

Suitable polyethers are polyalkylene ethers. These may be hydroxyl-terminated or amino-terminated (Jeffamines ®, manufactured by the company Texaco). Hydroxyl- or amino-terminated polyethylene glycols, polypropylene glycols or polybutylene glycols are particularly preferred. If M is derived from polydialkylsiloxanes, then these are preferably $C_1$–$C_4$polydialkylsiloxanes.

Preferred compounds are those of formulae I and III wherein A is —NR$^1$—, especially —NH—.

Particularly preferred compounds are those of formula I wherein Tr is a radical of formula V, A is —NH—, X is —(CH$_2$)$_5$— and p is 3.

Further preferred compounds are those of formulae I, II, III and IV wherein X, R, Y, X', R' and Z, if present, are unsubstituted radicals and Z has the meaning of Y and may also carry, as additional substituent containing active hydrogen atoms, a carboxyl group.

Compounds which are also particularly preferred are those of formula I which carry terminal carboxyl groups and in which n is an integer from 1 to 10, preferably from 1 to 4.

Further particularly preferred compounds are those of formulae I and III wherein A is —NR$^1$—, R$^1$ is hydrogen or $C_1$–$C_4$alkyl, X is $C_2$–$C_{20}$alkylene which is unsubstituted or substituted by $C_1$–$C_4$alkyl, $C_1$–$C_4$alkoxy or halogen, R is the radical of an aliphatic or cycloaliphatic diol after removal of the two hydroxyl groups, Y is the aromatic or heterocyclic radical of a dicarboxylic acid after removal of the two carboxyl groups, Z is the radical of an aromatic dicarboxylic acid or tricarboxylic acid after removal of the carboxyl groups, R' is the divalent radical of an aliphatic or cycloaliphatic hydroxycarboxylic acid after removal of the functional groups, n is an integer from 0 to 10, o is an integer from 1 to 10, m is 1 and p is 3 or 4, W is —NR$^1$ or —NR$^1$—X'—NR$^1$—OC—, and X" is the radical of an aliphatic or cycloaliphatic diamine after removal of the functional groups.

A further interesting subgroup of compounds of formulae I and III comprises those compounds wherein A is —NH—, X is —(CH$_2$)$_r$—, r is an integer from 5 to 12, in particular 5, R is an aliphatic or cycloaliphatic radical of a diol after removal of the two hydroxyl groups, R' is the aliphatic radical of a hydroxycarboxylic acid after removal of the functional groups, Y is the aliphatic or aromatic radical of a dicarboxylic acid after removal of the two carboxyl groups, Z has one of the meanings of Y and may carry as substituent an additional carboxyl group, n is 0 to 4, o is 1 to 4 and m is 1.

Particularly interesting compounds are those of formulae I and II wherein R is derived from ethylene glycol, propylene glycol, 1,4-butanediol, neopentyl glycol, 1,6-hexanediol, 1,12-dodecanediol, polyethylene glycol, polypropylene glycol, polybutylene glycol, polyhexamethylene glycol and 1,4-cyclohexanedimethanol and wherein Y is derived from succinic, glutaric, adipic, sebabic or azelaic acid and from dimeric fatty acids, phthalic acid, isophthalic acid or terephthalic acid, and wherein m is 1 and Z is derived from one of the dicarboxylic acids indicated in the definition of Y or from trimellitic acid or trimesic acid, in particular from trimellitic acid.

Further preferred compounds are those of formula I wherein Tr is a radical of formula V, A is —NH—, X is —(CH$_2$)$_r$—, r is an integer from 5 to 12, in particular 5, R is derived from a $C_2$–$C_6$aliphatic diol or from polyethylene glycol, polypropylene glycol or polybutylene glycol containing 3 to 30 oxyalkylene units, Y is derived from succinic, adipic, sebabic or azelaic acid, Z has one of the meanings defined for Y or is derived from phthalic, isophthalic, terephthalic, trimellitic or trimesic acid, in particular from trimellitic acid, m is 1, p is 3 and n is an integer from 0 to 10.

Compounds which are also particularly preferred are those of formula I wherein Tr is a radical of formula V, A is —NH—, X is —(CH$_2$)$_5$—, R is derived from 1,6-hexanediol, neopentyl glycol or from mixtures of both alcohols, Y is derived from terephthalic acid, Z is derived from trimellitic acid, m is 1, n is an integer from 1 to 10, and q is 1.

The compounds of formulae I to IV mainly contain stelliform structures. In each compound 3*$_m$ or 4*$_m$ (i.e. preferably 3 to 8) functional end groups are present per molecule. These end groups may themselves carry one or more functional radicals, e.g. carboxyl groups.

As a rule, no three-dimensional crosslinking of the compounds of formulae I to IV takes place through these end groups; such cross-linking would cause a macrogel to form. However, it may occur that a small proportion of the polyester stars are linked to one another through their end groups. Such structures likewise fall within the scope of this invention.

The compounds of formula I can be prepared by reacting (a) the carboxylic acid of formula VII or VIII or a functionalised derivative thereof

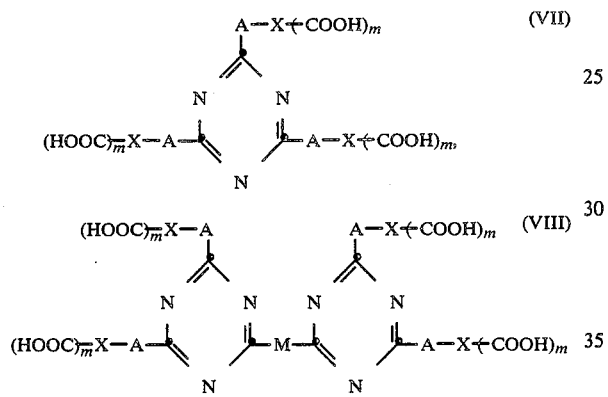

with (b), in the case of the carboxylic acid of formula VII, at least 3*$_m$ times the molar amount of the diol of formula IX, or, in the case of the carboxylic acid of formula VIII, at least 4*$_m$ times the molar amount of the diol of formula IX or of a functionalised derivative thereof $$HO-R-OH \qquad (IX)$$

and, if desired, with (c) the dicarboxylic acid of formula X or a functionalised derivative thereof $$HOOC-Y-COOH \qquad (X)$$

the radicals M, A, R, X and Y and the index m being as defined above.

The functionalised derivatives of the carboxylic acids of formulae VII, VIII and X shall be understood as being reactive derivatives suitable for the reaction with the diol of formula IX or with a functionalised derivative thereof, e.g. a carboxylic acid chloride or an ester.

A functionalised derivative of the diol of formula IX shall be understood as being a reactive derivative capable of reaction with a carboxylic acid or carboxylic acid derivative to form an ester group.

An example of a reactive derivative of the diol of formula IX is a diacetate of said diol.

If carboxyl-terminated esters of formula I are to be prepared, then the molar amounts of the components of formulae VII (or VIII) and IX and formula X are selected such that there is an excess of hydroxyl groups of the diol per each carboxylic acid group or reactive precursor thereof. If hydroxy-terminated esters of formula I are desired, then, correspondingly, an excess of the diol of formula IX is employed. Depending on the ratio of the carboxylic acid of formula VII (or VIII) and the diol of formula IX and the carboxylic acid of formula X to one another, the length of the chain of the resultant polyester of formula I may be varied. The dependence of the length of the chain of the polyester on the ratio of diol to carboxylic acid is known per se to the skilled person or it can be determined by routine tests.

As already mentioned, the condensation results in the formation of substantially stelliform polyesters since said polycondensation preferably takes place at the growing linear polyester chains and since surprisingly few crosslinking reactions are induced by the trifunctional triazine components.

Accordingly, the invention also relates to the preparation of polyesters of formula I, as outlined above.

In order to prepare carboxyl-terminated polyesters of formula I, per molar proportion of the carboxylic acid of formula VII or VIII preferably (3–40 )*m or (4–40)*m molar proportions of the diol of formula IX and (3'40)*m or (4–40)*m molar proportions of the dicarboxylic acid of formula X are reacted together, the molar ratio of the carboxyl groups to the hydroxyl groups being in the range from 1.01:1 to 1.5:1, preferably from 1.1:1 to 1.5:1. The same applies to reactions in which functionalised derivatives of the carboxylic acids are employed in place of the pure acids.

If hydroxyl-terminated products of formula I are to be prepared, then it is preferred to react those molar proportions of VII, (VIII), IX and X mentioned above. However, in this case the molar ratio of the carboxyl groups to the hydroxyl groups is in the range from 0.6:1 to 0.99:1, preferably from 0.9:1 to 0.99:1.

The preparation of the compounds of formula I wherein Z is a radical containing additional carboxylic acid or sulfonic acid radicals or Z differs from Y is carried out in two steps.

First a hydroxyl-terminated polyester of formula I is prepared as described above, and said polyester is subsequently further reacted with a di- or polycarboxylic acid of the formula HOOC—Z—(COOH)$_b$ (b≧1; preferably 1 or 2) or with a functionalised derivative thereof; it is particularly preferred to use trimellitic acid or trimellitic anhydride in said further reaction.

A particularly preferred embodiment of the preparation of compounds of formula I, which embodiment likewise constitutes an object of the present invention, comprises (a) preparing a hydroxyl-terminated polyester by esterification or transesterification, (b) reacting said polyester with a half COOH equivalent of the compound of formula VII or VIII until the acid value of the reaction mixture is less than 5 mg KOH/g, and (c) if desired, reacting the remaining hydroxyl groups with the corresponding molar proportion of a di- or tricarboxylic acid or of a functional derivative thereof, preferably with trimellitic acid, until the acid value of the reaction mixture is less than 100 mg KOH/g.

The polyester resins of formula I can be prepared by general procedures employed for the preparation of linear polyester resins. Thus the esterification may conveniently be carried out by effecting fusion condensation of the carboxylic acid component or components and the diol. In this esterification reaction, the reactants are for example heated, with stirring, to 240° C. It may prove opportune to pass an inert gas, e.g. nitrogen, through the reaction mixture in order to remove the water or, if an ester has been employed as functionalised carboxylic acid derivative, the lower alcohol forming during the esterification reaction. At the end of the esterification reaction a slight vacuum may also be applied in order to isolate any low molecular fission products remaining.

The preferred temperature range of the fusion condensation is from 190°–220° C.

The compounds of formula III can be obtained by reacting (a) a carboxylic acid of formula VII or VIII or a functional derivative thereof

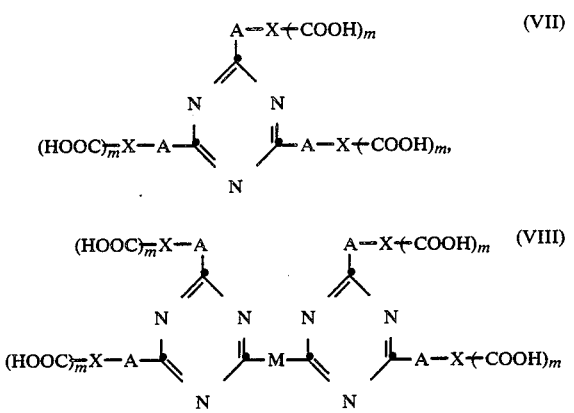

with (b), in the case of the carboxylic acid of formula VII or the corresponding functionalised derivative, at least 3*m times the molar amount of the hydroxycarboxylic acid of formula XI, or, in the case of the carboxylic acid of formula VIII or the corresponding derivative, at least 4*m times the molar amount of the hydroxycarboxylic acid of formula XI or of a functionalised derivative thereof $$HO-R'-COOH \qquad (XI)$$

the radicals A, X, M and R' and the index m being as defined above.

In order to prepare compounds of formula II, it is convenient to use triazine polyols of formula XII or XIII

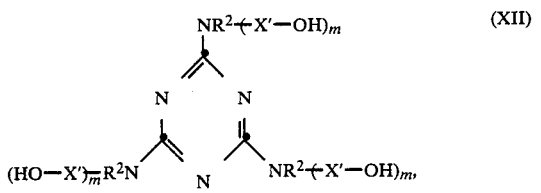

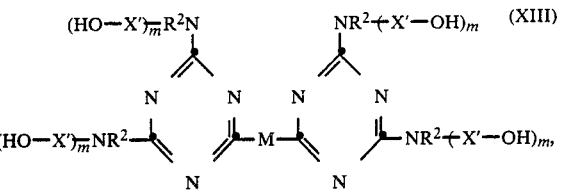

and to react said polyols with, in the case of the polyol of formula XII, at least 3*m times the molar amount of the dicarboxylic acid of formula X, or, in the case of the polyol of formula XIII, with at least 4*m times the molar amount of the dicarboxylic acid of formula X or of a functionalised derivative thereof $$HOOC-Y-COOH \qquad (X)$$

and optionally with the diol of formula IX or a functionalised derivative thereof $$HO-R-OH \qquad (IX)$$

and, if desired, subsequently to esterify a hydroxyl-terminated reaction product with the polycarboxylic acid HOOC—Z—(COOH)$_b$ (b≦1, preferably 1 or 2); the radicals M, X', R$^2$, R, Y and Z and the index m being as defined above.

If compounds of formula IV are defined, then the above-defined polyols of formulae XII or XIII are reacted with, in the case of the polyol of formula XII, at least 3*m times the molar amount of the hydroxycarboxylic acid of formula XI, as defined above, or, in the case of the polyol of formula XIII, at least 4*m times the molar amount of the hydroxycarboxylic acid of formula XI, as defined above, and, if desired, the resultant hydroxyl-terminated reaction product is subsequently esterified with the polycarboxylic acid HOOC—Z—(COOH)$_b$ (b≦1, preferably 1 or 2); the radicals M, X', R$^2$, R' and Z and the index m being as defined above.

The diols of formula IX, the dicarboxylic acids of formula X and the hydroxycarboxylic acids of formula XI are compounds which are known per se, some of which are commercially available. However, if not commercially available, they may be synthesised by known reactions.

The carboxylic acids of formula VII can be prepared in a manner known per se by reacting cyanuric chloride with hydroxycarboxylic acids or with aminocarboxylic acids. If desired, the carboxylic acids of formula VII can be subsequently converted into functionalised derivatives such as esters or acid chlorides. Compounds of formula VII are described for example in U.S. Pat. No. 4,402,907.

If cyanuric chloride is reacted with suitable aminoalcohols, then the polyols of formula XII are obtained as products. Such compounds are described for example in U.S. Pat. No. 3,573,301.

The polycarboxylic acids of formula VIII or the polyols of formula XIII can be prepared by reacting the cyanuric chloride derivative of formula XIV

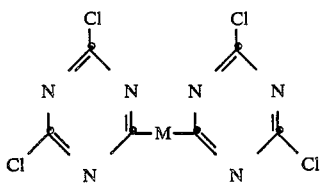

(XIV)

with aminocarboxylic or hydroxycarboxylic acids or with amino-alcohols.

Compounds of formula XIV are obtained by reacting amino- or hydroxyl-terminated oligomers, as defined above for the radical M, with cyanuric chloride. The reaction can, as is known, be controlled such that merely one chlorine atom per cyanuric chloride unit is exchanged. The hydroxyl- or amino-terminated oligomers which lead to the formation of the bridge M are either commercially available or they can be converted by methods known per se from commercially available carboxyl-terminated oligomers into amino-terminated compounds. For example, carboxyl-terminated oligomers, e.g. polybutadienes, can be converted by reaction with diamines into amino-amide acids.

The polyesters of the present invention have a variety of uses. Hydroxyl- or carboxyl-terminated triazine derivatives of this invention, either in the form of a mixture or in combination with other polyesters, can for example be used as hot melt adhesives. The polyesters of this invention may also be used as hardeners for compounds which can be crosslinked by compounds containing carboxyl or hydroxyl groups.

In particular the stelliform structure in combination with the flexible molecule fragments proves advantageous. Thus the hydroxyl-terminated polyesters of formulae I, II and IV and, in particular, the carboxyl-terminated polyesters of formulae I, II, III and IV are used as hardeners for resins containing at least one 1,2-epoxide group in the molecule.

Surprisingly, it has been found that, compared with corresponding polyester hardeners which do not contain the triazine component, the triazine-containing hardeners of this invention induce an accelerated curing reaction. Curing may therefore also be effected at reduced temperatures with the polyesters of this invention.

Accordingly, the present invention also relates to compositions which contain (a) a resin containing at least one 1,2-epoxide group in the molecule and (b) a compound of formula I, II, III or IV, as defined above.

Such compositions can be used with advantage as hot melt adhesives or as varnishes.

The invention therefore also relates to the use of the above-defined compositions as hot melt adhesives or as varnishes.

The invention further relates to the use of the compounds of formulae I, II, III or IV as components of hot melt adhesives.

It is particularly preferred to use the carboxyl-terminated polyesters of formulae I to IV as components in powder coating compositions. The use of polyesters in powder coating compositions is known per se and is described e.g. in German Offenlegungsschrift specifications Nos. 2 838 841 and 2 163 962 and in U.S. Pat. No. 3 397 254.

Thus the present invention also relates to powder coating compositions containing carboxyl-terminated polyesters of formula I, II, III or IV, as well as to the use of said compounds in powder coating compositions.

Examples of epoxy resins which contain on average more than one epoxide group in the molecule and which are employed as component (a) in the curable mixtures of this invention are in particular:

allicyclic polyepoxides such as vinylcyclohexane diepoxide, limonene diepoxide, dicyclopentadiene diepoxide, bis(2,3-epoxycyclopentyl)ether, bis(3,4-epoxycyclohexylmethyl)adipate, (3',4'-epoxycyclohexylmethyl)-3,4-epoxycyclohexane carboxylate, 3-(glycidyloxyethoxyethyl)-2,4-dioxaspiro(5.5)-8,9-epoxyundecane;

di- or polyglycidyl ethers of polyvalent aliphatic alcohols such as 1,4-butanediol, or polyalkylene glycols such as polypropylene glycols; di- or polyglycidyl ethers of cycloaliphatic polyols such as 2,2-bis(4-hydroxycyclohexyl)propane;

di- or polyglycidyl ethers of polyvalent phenols such as resorcinol, bis(4-hydroxyphenyl)methane (=bisphenol F), 2,2-bis(4-hydroxyphenyl)propane (=bisphenol A) or 2,2-bis(3,5-dibromo-4-hydroxyphenyl)propane (=tetrabrombisphenol A);

polyepoxides based on novolaks, in particular phenol/formaldehyde or cresol/formaldehyde novolaks:

polyglycidyl esters of polyvalent carboxylic acids such as phthalic acid, terephthalic acid or hexahydrophthalic acid;

N-glycidyl derivatives of amines, amides and heterocyclic nitrogen bases such as N,N-diglycidyl aniline, N,N-diglycidyl toluidine, triglycidyl isocyanurate or N,N,N',N'-tetraglycidyl bis(p-aminophenyl)methane or triglycidyl aminophenol.

Mixtures of different epoxy resins may also be used. The epoxide resins employed may be solid or liquid, with solid epoxy resins being preferred. The epoxide quivalent weight of the epoxy resins employed is advantageously in the range from 150 g/Val to 2500 g/Val, preferably in the range from 500 to 2000 g/Val.

The amounts of the epoxy resin (a) and the polyester (b) of the compositions of the present invention are preferably selected such that the ratio of carboxy equivalents of the polyester (b) to the epoxide equivalents of the epoxy resin (a) are in the range from 0.5 to 1.5. The curable compositions of this invention may, of course, also contain additional epoxy resins known to the skilled person. Examples of such known hardeners are aliphatic, cycloaliphatic, aromatic and heterocyclic amines such as bis(4-aminophenyl)methane, aniline/formaldehyde resins, bis(4-aminophenyl)sulfone, propane-1,3-diamine, hexamethylenediamine, diethylenetriamine, triethylenetetramine, 2,2,4-trimethylhexane-1,6-diamine, m-xylylenediamine, bis(4-aminocyclohexyl)methane, 2,2-bis(4-aminocyclohexyl)propane and 3-aminomethyl-3,5,5-trimethylcyclohexylamine (isophoronediamine), polyaminoamides such as those prepared from aliphatic polyamines and dimerised or trimerised fatty acids, polyphenols such as resorcinol, hydroquinone, 2,2-bis(4-hydroxyphenyl)propane (bisphenol A) and phenol/aldehyde resins, polythiols such as those polythiols which are commercially available under the name of 'Thiocols®', polycarboxylic acids and the anhydrides thereof such as phthalic anhydride, tetrahydrophthalic anhydride, hexahydrophthalic anhydride, hexachloroendomethylenetetrahydrophthalic anhydride, pyromellitic dianhydride, benzophenone-3,3',4,4'-tetracarboxylic dianhydride, the acids of the aforementioned anhydrides, and also isophthalic acid and terephthalic acid. Catalytic hardeners may also be used. Examples of such hardeners are tertiary amines [e.g. 2,4,6-tris(dimethylaminoethyl)phenol], imidazoles or Mannich bases; alkali metal alcoholates (e.g. the sodium alcoholate of 2,4-dihydroxy-3-hydroxymethylpentane), tin salts of alkane acids (e.g. tin octanoate), Friedel-Crafts catalysts such as boron trifluoride and boron trichloride and their complexes and chelates which are obtained by reacting boron trifluoride with e.g. 1,3-diketones, as well as substituted cyanamides such as dicyandiamide.

The curing can be effected either at a lower temperature or at a more elevated temperature. If desired, the curing can be effected in two steps by e.g. interrupting the curing procedure or, if a hardener for more elevated temperatures is employed, by allowing the curable mixture to cure partially at a lower temperature. The products thus obtained are fusible and soluble precondensates (B-stage resins) and are suitable e.g. for compression moulding compounds, sintered powders or prepregs.

The curable compositions of the invention may also contain plasticisers such as dibutyl phthalate, dioctyl phthalate or tricresyl phosphate, or additives such as extenders, fillers, reinforcing agents, dyes, flow control agents and mould release agents. Examples of suitable extenders, fillers and reinforcing agents are asbestos, asphalt, bitumen, glass fibres, textile fibres, carbon or boron fibres, mica, argillaceous earth, gypsum, titanium dioxide, chalk, powdered quartz, cellulose, kaolin, ground dolomite, wollastonite, siliceous earth with a large specific surface (available under the trade name of "Aerosil ®"), argillaceous earth modified with long-chain amines (available under the trade name of "Bentones ®"), pulverised polyvinyl chloride, polyolefin or aminoplastics, metallic powders such as aluminium or iron powder. Flame retardants such as antimony trioxide may also be added to the curable compositions.

If the compositions of the invention are employed as powder coating compositions, then further additives conventionally employed in the coating industry may be added to said powder coating compositions. Examples of such additives are light stabilisers and, in particular, deaerating agents, levelling agents and/or pigments.

Examples of levelling agents are polyvinyl acetals such as polyvinyl butyral ("Motival ®" B 30 H, manufactured by HOECHST), polyethylene glycol, polyvinyl pyrrolidone, glycerol, neopentyl glycol, acrylic copolymers such as "Modaflow ®" or "Acrylron ®" MFP, manufactured by MONSANTO and PROTEX respectively, and also "Acronal ®" 4F, manufactured by BASF, and "Uresin ®" B, manufactured by HOECHST, (a carbamic acid resin formed from butylurethane and formaldehyde).

It is preferred to use benzoin as deaerating agent.

The powder coating compositions can be prepared by simply mixing the components, for example in a ball mill. A better possibility of preparing them consists in melting the components together, preferably in an extruder or in a continuous kneader and then comminuting the cooled melt. The compositions preferably have a particle size in the range from 0.015 to 500 μm, most preferably from 10 to 75 μm.

The invention further relates to the use of the composition of the invention for the preparation of crosslinked products.

To this end, the composition is e.g. applied to the article to be coated and is heated to at least 120° C., preferably to a temperature in the range from 150° to 250° C., in order to cure the resin.

The invention also relates to moulded articles and coatings prepared by curing the composition of the invention.

PREPARATORY EXAMPLES

Example 1: A mixture of 156 g of 2,4,6-triscarboxypentylamino-1,3,5-triazine (0.33 mole), 118.18 g of 1,6-hexanediol and 188 g of azelaic acid is heated over 190 minutes to 220° C. At 150° C. water begins to distill off. After 4.5 hours the acid value is 72.2 mg KOH/g, after 10 hours 41.2 mg KOH/g and after a total of 15 hours it is less than 1 mg KOH/mg.

After the mixture has cooled, 350 g (95.6% of theory) of a semi-solid light brown ester resin with the following analytical data are obtained.

|  | calculated for $C_{66}H_{114}N_6O_{18}$ | found |
|---|---|---|
| % C | 61.95 | 62.18 |
| % H | 8.98 | 8.94 |
| % N | 6.97 | 6.47 |
| $\overline{M}n$ | — | 1937 |
| $\overline{M}w$ | — | 4977 |

Example 2: With stirring in an $N_2$ atmosphere,

| 776.5 g of dimethyl terephthalate, |
| 132.9 g of 1,6-hexanediol, |
| 351.5 g of neopentyl glycol and |
| 3.5 g of zinc acetate | are heated to 170° C. Methanol begins to distill off. In the course of 5 hours, the temperature is increased to 210° C., whereupon 295 ml of methanol distill off. This corresponds to 91.24% of the expected volume. A light yellow solid resin containing 1.70% of hydroxyl groups (corresponding to theory) is obtained.

78.5 g of triscarboxypentylamino-1,3,5-triazine are then added, and the mixture is condensed for a further 4.25 hours at 205° C. Subsequently, the acid value is less than 1 mg KOH/g. 96.1 g of trimellitic anhydride and 3.4 ml of benzylidimethylamine are added. After 3 hours at 230° C., 1132 parts of a light brown solid resin with the following properties are obtained:

| acid value: | 72.7 mg KOH/g |
| glass transition temperature | 50.5° C. |
| softening temperature (Kofler): | 75.0° C. |
| $\overline{M}n$: | 4120 |
| $\overline{M}w$: | 9750 |
| mean functionality (COOH): | 5.3 |

Example 3: With stirring in a nitrogen atmosphere, a mixture of 78.1 g (0.33 mole) of 2,4,6-triscarboxypentylamino-1,3,5-triazine, 75.0 g (0.50 mole) of triethylene glycol and 101 g (0.50 mole) of sebacic acid are heated over 60 minutes to 220° C. At 150° C. water begins to distill. After 5 hours, the mixture is left to cool, affording 223 g (98.6% of theory) of a highly viscous slightly yellowish polyester resin with the following analytical data:

|  | calculated for $C_{69}H_{120}N_6O_4$ | found |
|---|---|---|
| % C | 58.46 | 58.27 |
| % H | 8.53 | 8.57 |
| % N | 5.93 | 5.90 |
| $\overline{M}n$ | 1416 | 1560 |
| $\overline{M}w/\overline{M}n$ | — | 3.3 |
| acid value (mg KOH/g) | 118 | 138 |

Example 4: With stirring in a nitrogen atmosphere, a mixture of 60 g (0.128 mole) of 2,4,6-triscarboxypentylamino-1,3,5-triazine, 57.6 g (0.384 mole) of anhydrous triethylene glycol and 63.76 g (0.384 mole) of phthalic acid is heated over 1 hour to 210° C. The water is distilled off, and the mixture is stirred for a further 5 hours at 210° C. After the mixture has cooled, 149 g (90.3% of theory) of a very viscous slightly yellowish ester resin with the following analytical data are isolated:

|  | calculated for $C_{63}H_{84}O_{24}N_6$ | found |
|---|---|---|
| % C | 57.79 | 57.13 |
| % H | 6.47 | 6.73 |
| % N | 6.42 | 6.55 |
| $\overline{M}n$ | 1308 | 709 |
| $\overline{M}w/\overline{M}n$ |  | 2.8 |
| acid value (mg KOH/g) | 128 | 149 |
| Tg (°C.) |  | −2 |

Example 5: With stirring in a nitrogen atmosphere, a mixture of 156 g (0.33 mole) of 2,4,6-triscarboxypentylamino-1,3,5-triazine, 120.4 g (1.00 mole) of 1,6-hexanediol and 202.0 g (1.00 mole) of sebacic acid is heated over 90 minutes to 220° C. The mixture is stirred for 5 hours at this temperature, whereupon water distills off. After the mixture has cooled, 420 g (99% of theory) of a semisold slightly yellowish polyester resin with the following analytical data are isolated:

|  | calculated for $C_{69}H_{120}N_6O_{18}$ | found |
|---|---|---|
| % C | 62.70 | 62.82 |
| % H | 9.15 | 9.14 |
| % N | 6.36 | 6.30 |
| $\overline{M}n$ | 1320 | 3930 |
| $\overline{M}w/\overline{M}n$ | — | 3.8 |
| acid value (mg KOH/g) | 127 | 146 |
| Tg (°C.) |  | 45 |

Example 6: With stirring in a nitrogen atmosphere, a mixture of 156 g (0.33 mole) of 2,4,6-triscarboxypentylamino-1,3,5-triazine, 118 g (1.00 mole) of 1,6-hexanediol and 166 g (1.00 mole) of isophthalic acid is heated over 90 minutes to 212° C., and the mixture is stirred for a further 5 hours at 215° C. After the mixture has cooled, 363.7 g (89.9% of theory) of a solid polyester resin with a softening temperature of 77° C. (as determined on a Kofler bench) are isolated. The following analytical data are found:

|  | calculated for $C_{63}H_{84}O_{18}N_6$ | found |
|---|---|---|
| % C | 62.36 | 61.92 |
| % H | 6.98 | 7.04 |
| % N | 6.93 | 6.94 |
| $\overline{M}n$ | 1212 | 908 |
| $\overline{M}w/\overline{M}n$ |  | 3.1 |
| acid value (mg KOH/g) | 138 | 132 |
| Tg (°C.) |  | 25 |

Example 7: With stirring in a nitrogen atmosphere, a mixture of 156.0 g (0.33 mole) of 2,4,6-triscarboxypentylamino-1,3,5-triazine, 104 g (1.00 mole) of neopentyl glycol and 146 g (1.00 mole) of adipic acid is heated over 60 minutes to 225° C. The mixture is stirred for 5 hours at 255° C., whereupon water distills off. After the mixture has cooled, 338.8 g (91.5% of theory) of a semiliquid slightly yellowish polyester resin with the following analytical data are isolated:

|  | calculated for $C_{54}H_{90}O_{18}N_6$ | found |
|---|---|---|
| % C | 58.36 | 58.45 |
| % H | 8.16 | 8.13 |
| % N | 7.56 | 7.92 |
| $\overline{M}n$ | 1110 | 1509 |
| $\overline{M}w/\overline{M}n$ |  | 3.7 |
| acid value (mg KOH/g) | 151 | 146 |
| Tg (°C.) |  | −6 |

Example 8: With stirring in a nitrogen atmosphere, a mixture of 156 g (0.33 mole) of 2,4,6-triscarboxypentylamino-1,3,5-triazine, 292 g (2.00 moles) of adipic acid and 208 g (2.00 moles) of neopentyl glycol is heated over 90 minutes to 220° C., and the mixture is stirred for a further 5 hours at 220° C. After the mixture has cooled, 545 g (99% of theory) of a highly viscous slightly yellowish polyester resin with the following analytical data are isolated:

|  | calculated for $C_{87}H_{129}O_{33}N_6$ | found |
|---|---|---|
| % C | 58.54 | 59.08 |
| % H | 7.23 | 8.17 |
| % N | 4.70 | 4.89 |
| $\overline{M}n$ | 1785 | 1843 |
| $\overline{M}w/\overline{M}n$ |  | 4.4 |
| acid value (mg KOH/g) | 94 | 135 |
| Tg (°C.) |  | −20 |

Example 9: With stirring in a nitrogen atmosphere, a mixture of 156 g (0.33 mole) of 2,4,6-triscarboxypentylamino-1,3,5-triazine, 146.1 g (1.00 mole) of adipic acid and 150.1 g (1.00 mole) of triethylene glycol is heated over 60 minutes to 225° C. The mixture is stirred for a further 5 hours at 225° C., whereupon water distills off. After the mixture has cooled, 389.6 g (93.5% of theory) of a highly viscous slightly yellowish polyester resin with the following analytical data are isolated:

|  | calculated for $C_{57}H_{96}O_{24}N_6$ | found |
|---|---|---|
| % C | 54.80 | 54.54 |
| % H | 7.75 | 7.78 |
| % N | 6.73 | 6.89 |
| $\overline{M}n$ | 1248 | 1108 |
| $\overline{M}w/\overline{M}n$ |  | 4.6 |
| acid value (mg KOH/g) | 134 | 130 |
| Tm (°C.) |  | 60 |

Example 10: With stirring in a nitrogen atmosphere, 97.86 g (0.209 mole) of 2,4,6-triscarboxypentylamino-1,3,5-triazine, 91.7 g (0.627 mole) of adipic acid and 400 g of polytetrahydrofuran (OH value=176) are heated over 90 minutes to 220° C. The mixture is stirred for a further 5 hours at 220° C., whereupon water distills off. After the mixture has cooled, 524 g (92.2% of theory) of a highly viscous slightly yellowish polyester resin with the following analytical data are isolated:

|  | calculated for $C_{144}H_{276}N_6O_{42}$ | found |
|---|---|---|
| % C | 62.58 | 62.83 |
| % H | 10.06 | 9.70 |
| % N | 3.03 | 3.04 |
| $\overline{Mn}$ | 2764 | 3130 |
| $\overline{Mw}/\overline{Mn}$ |  | 5.4 |
| acid value (mg KOH/g) | 59.5 | 62 |
| Tm (°C.) |  | 12 |

Example 11: With stirring in a nitrogen atmosphere, a mixture of 97.86 g (0.209 mole) of 2,4,6-triscarboxypentylamino-1,3,5-triazine and 400 g of polytetrahydrofuran (OH value=176) is heated over 90 minutes to 205° C. The mixture is stirred for 5 hours at 205° C., whereupon water distills off. After the mixture has been stirred for 1 hour at 50 mbar, 477.76 g (94.5% of theory) of a highly viscous polyol with the following analytical data are isolated:

|  | calculated for $C_{129}H_{252}O_{33}N_6$ | found |
|---|---|---|
| % C | 64.15 | 63.68 |
| % H | 10.15 | 10.46 |
| % N | 3.47 | 3.60 |
| $\overline{Mn}$ | 2415 | 2218 |
| $\overline{Mw}/\overline{Mn}$ |  | 2.9 |
| OH value (mg KOH/g) | 69 | 77 |

Example 12: With stirring in a nitrogen atmosphere, 156 g (0.33 mole) of 2,4,6-triscarboxypentylamino-1,3,5-triazine, 236 g (2.00 moles) of 1,6-hexanediol and 332 g (2.00 moles) of isophthalic acid are heated over 2 hours to 240° C. The mixture is stirred for a further 5 hours until all the water has distilled off. After the mixture has cooled, 628 g (96.8% of theory) of a solid polyester resin with a softening temperature of 60° C. (as determined on a Kofler bench) are isolated.

|  | calculated for $C_{105}H_{132}O_{30}N_6$ | found |
|---|---|---|
| % C | 64.40 | 64.38 |
| % H | 6.74 | 6.86 |
| % N | 4.29 | 4.30 |
| $\overline{Mn}$ | 1958 | 1158 |
| $\overline{Mw}/\overline{Mn}$ |  | 3.2 |
| acid value (mg KOH/g) | 85 | 131 |
| Tg (°C.) |  | 20 |

Example 13: With stirring in a nitrogen atmosphere, 156 g (0.33 mole) of 2,4,6-triscarboxypentylamino-1,3,5-triazine, 166 g (1.00 mole) of diethylene glycol and 106 g (1.00 mole) of isophthalic acid are heated over 90 minutes to 220° C., whereupon water distills off. After stirring for 5 hours at 220° C., 358 g (91.3% of theory) of a solid polyester resin with a softening temperature of 70° C. (as determined on a Kofler bench) are isolated.

|  | calculated for $C_{57}H_{72}O_{21}N_6$ | found |
|---|---|---|
| % C | 58.16 | 58.16 |
| % C | 6.17 | 6.27 |
| % N | 7.14 | 7.26 |
| $\overline{Mn}$ | 1176 | 856 |
| $\overline{Mw}/\overline{Mn}$ |  | 2.4 |
| acid value (mg KOH/g) | 142 | 106 |
| Tg (°C.) |  | 22 |

Example 14: With stirring in a nitrogen atmosphere, a mixture of 531 g (4.50 moles) of hexanediol, 776 g (4,00 moles) of methyl terephthalate and 4.8 g of zinc acetate dihydrate is heated at 160° C. until virtually all of the methanol has distilled off, and the mixture is then stirred for 5 hours at 217° C. After stirring for 40 minutes at 200 mbar, 78 g (0.166 mole) of 2,4,6-triscarboxypentylamino-1,3,5-triazine are added, the mixture is stirred for 2 hours and 15 minutes at 218° C., a vacuum of 300 mbar is applied and, finally, 96 g (0.50 mole) of trimesic anhydride are added. After half an hour at 217° C., 1080 g (88.2% of theory) of a white polyester resin with a softening temperature of 135° C. (as determined on a Kofler bench) are isolated.

|  | calculated for $C_{402}H_{468}N_6O_{120}$ | found |
|---|---|---|
| % C | 66.04 | 65.43 |
| % H | 6.45 | 6.40 |
| % N | 1.15 | 1.12 |
| $\overline{Mn}$ | 7304 | 5823 |
| $\overline{Mw}/\overline{Mn}$ |  | 6.0 |
| acid value (mg KOH/g) | 77 | 57.7 |
| Tm (°C.) |  | 138 |
| Tg (°C.) |  | 30 |

Example 15: With stirring in a nitrogen atmosphere, a mixture of 532 g (4.50 moles) of hexanediol, 388.4 g (2.00 moles) of dimethyl terephthalate, 388.4 g (2.00 moles) of dimethyl isophthalate and 4 g of zinc acetate is heated at 160° C. until most of the methanol has distilled off. After 5 hours' stirring at 200° C. and 30 minutes' evacuation (150 mbar), 78 g (0.17 mole) of 2,4,6-triscarboxypentylamino-1,3,5-triazine are added. After 2 hours and 35 minutes, the mixture is stirred for 35 minutes at 300 mbar, and 96 g (0.50 mole) of trimellitic anhydride are then added. After a further 90 minutes at 200° C., 1070 g (87.3% of theory) of a rubber-like amorphous brownish solid resin with a softening temperature of 84° C. (as determined on a Kofler bench) are isolated.

|  | calculated for $C_{402}H_{468}N_6O_{120}$ | found |
|---|---|---|
| % C | 66.04 | 65.57 |
| % C | 6.45 | 6.47 |
| % N | 1.15 | 1.04 |
| $\overline{Mn}$ | 7304 | 5585 |
| $\overline{Mw}/\overline{Mn}$ |  | 5.5 |
| acid value (mg KOH/g) | 77 | 51 |
| Tg (°C.) |  | 16 |

Example 16: With stirring in a nitrogen atmosphere, a mixture of 472 g (4.00 moles) of 1,6-hexanediol, 315 g (0.50 mole) of dihydroxyl-terminated polytetrahydrofuran (OH value 178), 776 g (4.00 moles) of dimethyl terephthalate and 4.8 g of zinc diacetate dihydrate is heated to 160° C. until most of the methanol has distilled off. The mixture is subsequently heated for 5 hours to 220° C. and stirred for 40 minutes at 220° C. and 170 mbar. 78 g (0.166 mole) of 2,4,6-triscarboxypentylamino-1,3,5-triazine are added, and the mixture is then stirred for a further 2 hours and 15 minutes at 220° C. After 20 minutes at 300 mbar the condensation is complete, and 96 g (0.50 mole) of trimellitic anhydride are then added. After stirring for 105 minutes at 210° C., 1350 g (91% of theory) of a solid white polyester resin with a softening temperature of 122° C. (as determined on a Kofler bench) and with the following analytical data are isolated:

|  | found |
|---|---|
| % C | 65.45 |
| % H | 7.23 |
| % N | 0.92 |
| acid value (mg KOH/g) | 39 |
| Tm (°C.) | 119 |
| Tg (°C.) | 39 |
| $\overline{Mn}$ | 5978 |
| $\overline{Mw}/\overline{Mn}$ | 6.40 |

Example 17: With stirring in a nitrogen atmosphere, a mixture of 532 g (4.50 moles) of 1,6-hexanediol, 582.6 g (3.00 moles) of dimethyl terephthalate, 194.2 g (1.00 mole) of dimethyl isophthalate and 4 g of zinc acetate dihydrate is heated at 160° C. until most of the methanol has distilled off, and the mixture is subsequently stirred for 5 hours at 212° C. After 30 minutes under vacuum (170 mbar), 78 g (0.17 mole) of 2,4,6-triscarboxypentylamino-1,3,5-triazine are added, the mixture is stirred for 2 hours and 45 minutes at 212° C. and evacuated for 25 minutes at 300 mbar, and 96 mg (0.5 mole) of trimellitic anhydride are added. After stirring for 90 minutes at 212° C., 1000 g (81.2% of theory) of a solid white polyester resin with a softening temperature of 100° C. (as determined on a Kofler bench) are isolated.

|  | calculated for $C_{402}H_{468}N_6O_{120}$ | found |
|---|---|---|
| % C | 66.04 | 65.86 |
| % H | 6.45 | 6.47 |
| % N | 1.15 | 1.14 |
| $\overline{Mn}$ | 7304 | 6230 |
| $\overline{Mw}/\overline{Mn}$ |  | 6.3 |
| acid value (mg KOH/g) | 77 | 48 |
| Tm (°C.) |  | 96 |
| Tg (°C.) |  | 24 |

Example 18: With stirring in a nitrogen atmosphere, a mixture of 405.5 g (4.50 moles) of 1,4-butanediol, 233 g (1.20 moles) of dimethyl terephthalate, 543.8 g (2.80 moles) of dimethyl isophthalate and 7.6 g of zinc acetate dihydrate is heated to 160° C. until most of the methanol has distilled off, and then for 5 hours at 205° C. After stirring for 45 minutes at 200 mbar, 78 mg (0.17 mole) of 2,4,6-triscarboxypentylamino-1,3,5-triazine are added, and the mixture is heated for 2 hours and 30 minutes at 210° C. and then evacuated for 15 minutes at 300 mbar. 96 mg (0.50 mole) of trimellitic anhydride are then added, and the mixture is stirred for 90 minutes at 197° C. 980 g of a vitreous slightly brownish solid polyester resin with a softening temperature of 52° C. (as determined on a Kofler bench) are isolated.

|  | calculated for $C_{348}H_{360}N_6O_{120}$ | found |
|---|---|---|
| % C | 63.78 | 63.19 |
| % H | 5.54 | 5.40 |
| % N | 1.28 | 1.28 |
| acid value (mg KOH/g) | 86.0 | 114 |
| Tg (°C.) |  | 26 |

Example 19: As described in Example 18, with stirring in a nitrogen atmosphere, a mixture of 405.5 g (4.50 moles) of 1,4-butanediol, 388.4 g (2.00 moles) of dimethyl terephthalate and 388.4 g (2.00 moles) of dimethyl isophthalate is heated and condensed with 78 g (0.17 mole) of 2,4,6-triscarboxypentylamino-1,3,5-triazine and finally with 96 g (0.50 mole) of trimellitic anhydride. 950 g (83.7% of theory) of a brownish glass with a softening temperature of 73° C. (as determined on a Kofler bench) are isolated.

|  | calculated for $C_{340}H_{360}N_6O_{120}$ | found |
|---|---|---|
| % C | 63.78 | 63.16 |
| % H | 5.54 | 5.41 |
| % N | 1.28 | 1.30 |
| acid value (mg KOH/g) | 86 | 101 |
| Tg (°C.) |  | 27 |

Example 20: As described in Example 18, 405.5 g (4.50 moles) of 1,4-butanediol, 543.8 g (2.80 moles) of dimethyl terephthalate, 233. g (1.30 moles) of dimethyl isophthalate and 4 g of zinc acetate dihydrate are condensed with 78 g (0.17 mole) of 2,4,6-triscarboxypentylamino-1,3,5-triazine and finally with 96 g (0.50 mole) of trimellitic anhydride. 950 g (83.70% of theory) of a solid white polyester with a softening temperature of 152° C. (as determined on a Kofler bench) are isolated.

|  | calculated for $C_{204}H_{216}N_6O_{72}$ | found |
|---|---|---|
| % C | 63.78 | 63.22 |
| % H | 5.54 | 5.39 |
| % N | 1.28 | 1.34 |
| acid value (mg KOH/g) | 86 | 90 |
| Tm (°C.) |  | 165 |
| Tg (°C.) |  | 32 |

Example 21: With stirring in a nitrogen atmosphere, a mixture of 27.5 g (0.08 mole) of 2,4,6-tris(ethylaminobenzoate)-1,3,5-triazine, 159 g (0.25 mole) of dihydroxyl-terminated polytetrahydrofuran (OH value 178) and 0.5 g of zinc acetate is heated for 4 hours at 220° C. and finally for 1 hour at 50 mbar. Subsequently, 37 g (0.25 mole) of phthalic anhydride are added, and the mixture is stirred for 70 minutes at 175° C. 207 g (95.8% of theory) of a highly viscous polyester resin with the following analytical data are isolated:

|  | calculated for $C_{156}H_{246}O_{42}N_6$ | found |
|---|---|---|
| % C | 65.11 | 65.02 |
| % H | 8.62 | 8.95 |
| % N | 2.92 | 2.93 |
| $\overline{Mn}$ | 2877 | 2023 |
| $\overline{Mw}/\overline{Mn}$ |  | 2.3 |

-continued

|  | calculated for $C_{156}H_{246}O_{42}N_6$ | found |
|---|---|---|
| acid value (mg KOH/g) | 58 | 86 |

Example 22: With stirring in a nitrogen atmosphere, a mixture of 55 g (0.17 mole) of 2,4,6-tris(ethylaminobenzoate)-1,3,5-triazine, 59 g (0.50 mole) of 1,6-hexanediol and 0.5 g of zinc acetate dihydrate is heated for 4 hours to 215° C., whereupon ethanol distills off. After a vacuum of 50 mbar has been applied over 50 minutes, 74 g (0.50 mole) of phthalic anhydride are added. After stirring for 70 minutes at 175° C., 143.7 g (83% of theory) of a solid polyester resin with a softening point of 76° C. (as determined on a Kofler bench) are isolated.

|  | calculated for $C_{66}H_{66}N_6O_{18}$ | found |
|---|---|---|
| % C | 64.38 | 64.73 |
| % H | 5.40 | 5.70 |
| $\overline{Mn}$ | 1231 | 1014 |
| Mw/Mn |  | 5.7 |
| acid value (mg KOH/g) | 136 | 155 |
| Tg (°C.) |  | 28 |

Example 23: With stirring in a nitrogen atmosphere, a mixture of 156 g (0.33 mole) of 2,4,6-triscarboxypentylamino-1,3,5-triazine and 636 g (1.00 mole) of dihydroxyl-terminated polytetrahydrofuran (OH value 178 mg) is heated for 3 hours at 210° C. and evacuated at 100 mbar for 2 hours. Then 194 g (1.00 mole) of trimellitic anhydride are added at 160° C. After stirring for 2 hours at 160° C., 890 g (92% of theory) of a viscous liquid polyester resin with the following analytic data are isolated:

|  | calculated for $C_{156}H_{264}N_6O_{48}$ | found |
|---|---|---|
| % C | 62.63 | 62.29 |
| % H | 8.89 | 8.78 |
| % N | 2.80 | 2.88 |
| $\overline{Mn}$ | 2991 | 3140 |
| Mw/Mn |  | 4.45 |
| acid value (mg KOH/g) | 112 | 72 |

Example 24: With stirring in a nitrogen atmosphere, 39 g (0.08 mole) of 2,4,6-triscarboxypentylamino-1,3,5-triazine and 500 g (0.25 mole) of dihydroxyl-terminated polytetrahydrofuran (OH value 56) are heated for 3 hours at 220° C. After 2 hours' condensation at 100 mbar, 48 g (0.25 mole) of trimellitic anhydride are added at 170° C., and the mixture is stirred for a further 2 hours. 555 g (95% of theory) of a slightly yellowish viscous polyester resin with the following analytical data are isolated:

| % C | 64.77 |
| --- | --- |
| % H | 10.06 |
| % N | 1.18 |
| $\overline{Mn}$ | 5506 (calc. 7000) |
| Mw/Mn | 3.7 |
| acid value (mg KOH/g) | 51 (calc. 48) |

Example 25: With stirring in a nitrogen atmosphere, 39 g (0.083 mole) of 2,4,6-triscarboxypentylamino-1,3,5-triazine and 500 g of dihydroxyl-terminated polytetrahydrofuran (OH value 56) are heated for 5 hours at 210° C., whereupon water distills off. After condensation at 50 mbar, a slightly yellowish liquid polyester resin with the following analytical data is isolated:

| % C | 65.44 |
| --- | --- |
| % H | 10.75 |
| % N | 1.33 |
| $\overline{Mn}$ | 6339 (calc. 6420) |
| Mw/Mn | 3.7 |
| OH value (mg KOH/g) | 26 (calc. 33) |

Example 26: With stirring in a nitrogen atmosphere, 468 g (1.00 mole) of 2,4,6-triscarboxypentylamino-1,3,5-triazine and 354 g (3.00 moles) of 1,6-hexanediol are heated for 5 hours at 210° C. and subsequently for 2 hours at 100 mbar. 748 g (97% of theory) of a semisolid polyester with the following analytical data are isolated:

|  | calculated for $C_{39}H_{72}N_6O_9$ | found |
|---|---|---|
| % C | 60.90 | 60.60 |
| % H | 9.43 | 9.42 |
| % N | 10.90 | 10.95 |
| $\overline{Mn}$ | 769 | 1515 |
| Mw/Mn |  | 3.4 |
| OH value (mg KOH/g) | 218 | 218 |

Example 27: With stirring in a nitrogen atmosphere, a mixture of 472 g (4 moles) of 1,6-hexanediol, 348.4 g (2.00 moles) of dimethyl adipate and 2 g of zinc acetate dihydrate is heated for 5 hours to 200° C., whereupon methanol distills off. After condensation has been effected for 1 hour at 200 mbar, 312 g (0.66 mole) of 2,4,6-tris-carboxypentylamino-1,3,5-triazine are added, the mixture is stirred for 2 hours and a vacuum of 300 mbar is applied for 45 minutes. 930 g (94% of theory) of a slightly yellowish semisolid polyester resin with the following analytical data are isolated:

|  | calculated for $C_{75}H_{132}N_6O_{21}$ | found |
|---|---|---|
| % C | 61.96 | 61.92 |
| % H | 9.15 | 9.20 |
| % N | 5.77 | 5.84 |
| $\overline{Mn}$ | 1454 | 2405 |
| Mw/Mn |  | 6.9 |
| OH value (mg KOH/g) | 115 | 127 |

Example 28: With stirring in a nitrogen atmosphere, 51.6 g (0.20 mole) of 2,4,6-trishydroxyethylamino-1,3,5-triazine and 121.4 g (0.60 moles) of sebabic acid are heated for 5 hours to 200° C., whereupon water distills off. After a vacuum of 200 mbar has been applied for 1 hour, 142.6 g (87.9% of theory) of a semisolid polyester resin with the following analytical data are isolated:

|  | calculated for $C_{39}H_{66}N_6O_{12}$ | found |
|---|---|---|
| % C | 57.76 | 57.91 |
| % H | 8.20 | 8.50 |
| % N | 10.36 | 10.11 |
| $\overline{Mn}$ | 810 | 515 |
| Mw/Mn |  | 2.3 |
| acid value (mg KOH/g) | 276 | 237 |

Example 29: To a solution of 184 g (1.00 mole) of 2,4,6-trichloro-1,3,5-triazine in 2 l of dry dioxane in which 280 g (2.00 moles) of potassium carbonate are suspended is added dropwise, under ice cooling, a solution of 375 g (0.50 mole) of bisaminopropylpolytetrahydrofuran ($\overline{M}n=750$) such that the temperature of the mixture does not exceed 20° C. After the exothermic reaction has subsided, the mixture is stirred for 15 minutes, and then 28 g (2.00 moles) of aminoethanol are added dropwise at 20° C. The mixture is then boiled under reflux overnight, the salt is filtered off warm, and the solvent is drawn off in vacuo. The wax-like resin has an OH value of 170 (calculated 190) and a molecular weight $\overline{M}n=728$, $\overline{M}w/\overline{M}n=3.1$ (calculated $\overline{M}n=1175$). 118 g (0.1 mole) of this resin are heated with 80.9 g (0.40 mole) of sebacic acid for 5 hours to 240° C., whereupon water distills off. After condensation has been effected at this temperature for 1 hour at 200 mbar, 157.9 g (82.3% of theory) of semisolid polyester resin with the following analytical data are isolated:

|  | calculated for $C_{96}H_{174}O_{26}N_{12}$ | found |
|---|---|---|
| % C | 60.31 | 60.05 |
| % H | 9.17 | 9.12 |
| % N | 8.78 | 9.01 |
| $\overline{M}n$ | 1912 | 1423 |
| $\overline{M}w/\overline{M}n$ |  | 2.9 |
| acid value (mg KOH/g) | 117 | 94 |

Example 30: A mixture of 400 g (2 moles) dimethyl cyclohexane-1,4-dicarboxylate, 388 g (2 moles) dimethyl isophthalate, 648 g (4.5 moles) cyclohexane-1,4-dimethanol and 3.5 g zinc acetate is heated under nitrogen at 160° C. until all methanol formed is distilled off. Then the mixture is heated for four hours at 210° C. After this the mixture is stirred for 30 minutes at 210° C. at 200 mbar. Then 78.5 g (0.166 moles) 2,4,6-tricarboxypentylamino-1,3,5-triazine are added. The mixture is stirred for another two hours and 15 minutes at 210° C. and at a pressure of 300 mbar. Then 96.1 g (1 mol) trimellitic anhydride are added and heating at 210° C. is continued for 90 minutes. A solid glassy polyester resin is isolated. The resin has the following analytical data:

| softening temperature (Kofler bench): | 110° C. |
|---|---|
| glass transition temperature: | 54° C. |
| acid number: | 36 mg KOH/g |
| $M_n$: | 2900 |
| $M_w/M_n$: | 3.3 |

APPLICATION EXAMPLES

Example A: Metal strips of Anticorodal are cemented with a mixture of 4.65 g of Araldite F (epoxide value=5.04 Val/kg) and 5 g of the polyester of Example 1 and cured for
  3 hours at 120° C.
  3 hours at 180° C.
  1 hour at 200° C.
The shear strength according to DIN 53183 is 17.99N/mm$^2$.

Example B: The procedure of Example A is repeated and the following adhesive mixture is tested:

| diglycidyl ether based on bisphenol A*: | 9.19 g |
|---|---|
| polyester of Example 1: | 5.00 g |

*epoxide value: 5.25 Val/kg

The shear strength according to DIN 53183 is 22.5N/mm$^2$.

Example C: The procedure of Example A is repeated and the following adhesive mixture is tested:

| epoxidised phenol/novolak**: | 4.11 g |
|---|---|
| polyester of Example 1: | 5.00 g |

**epoxide value: 6.0 Val/kg

The shear strength according to DIN 53183 is 20.2N/mm$^2$.

Example D: 5 g of the polyester resin of Example 1 are cured with 1.2 g of triglycidyl isocyanurate at 100° C. The gelling time is determined as being 19 minutes at 100° C.

Example E: Metal strips of Anticorodal are cemented with a mixture of a polyester resin of Examples 3 to 10 and diglycidyl ether of bisphenol A (epoxide value: 5.3 Val/kg), with one equivalent of carboxyl group corresponding to one equivalent of epoxide group. Curing is effected for 8 hours at 140° C. The shear strengths are determined according to DIN 53183. The results are shown in the following Table:

| Polyester resin of Example | Shear strength (N/mm$^2$) |
|---|---|
| 3 | 4.1 (±0.2) |
| 4 | 16.0 (±1.2) |
| 5 | 8.8 (±0.4) |
| 6 | 25.3 (±2.3) |
| 7 | 16.6 (±1.6) |
| 8 | 7.7 (±0.3) |
| 9 | 5.3 (±0.6) |
| 10 | 2.5 (±0.2) |

Example F: Preparation of a powder coating composition

| Components: |
|---|
| 440 g of polyester of Example 2 |
| 60 g of triglycidyl isocyanurate |
| 5 g of Modaflow ® Powder II |
| 1 g of benzoin |
| 250 g of titanium dioxide |

The components are mixed together for 15 minutes in a free-falling mixer. The mixture is homogenised at 80°–100° C. in an extruder, cooled and subsequently ground to an average particle size of 50 μm. The powder is then applied with an electrostatic spray gun to purified aluminium sheet and cured for 15 minutes at 200° C. The varnish film obtained has a thickness of about 60 μm and exhibits very good mechanical properties and a very good resistance to weathering.

| Measured values | |
|---|---|
| baking conditions: | 15 minutes at 200° C. |
| Erichsen ductility[1] (mm): | 9.0 |
| impact resistance[2] (cm/kg): | 160 |
| acetone test[3] (grade): | 2 |
| gloss (%): | 85 |
| gloss after 1500 hours weathering' | 85 |

-continued

Measured values
in a weather-o-meter:

(1)Erichsen ductility test: Test according to DIN 53156
(2)Impact resistance: An object of known weight is dropped from a specific height onto the back of a coated aluminium sheet. The value obtained (height × weight) indicates the greatest impact at which the film still remains intact.
(3)Acetone test: A rag impregnated with acetone is left on the coated surface for 1 minute. The treated surface is then tested with a finger-nail for resistance to solvents. Evaluation is made in accordance with a scale of 0 to 5, with 0 indicating excellent resistance and 5 indicating bad resistance.

Example G: (Hot melt adhesive)
A melt of the polyester resin of Example 16 is applied at 180° C. to aluminium test samples which are then pressed together. After cooling, a shear strength of 8.9N/mm² is measured.

What is claimed is:

1. A compound of formula I, II, III or IV $$[Tr]\!\!\!\!-\!\!\!\left\{\!A\!-\!X\!\!\left[\!\!\begin{array}{c}O\\\|\\C\end{array}\!\!-\!O\!\right]_{\!\!\!\!n}\!\!R\!-\!O\!-\!\begin{array}{c}O\\\|\\C\end{array}\!-\!Y\!-\!\begin{array}{c}O\\\|\\C\end{array}\!-\!O\!\right]_{\!\!\!\!n}\quad\text{(I)}$$

$$-R-O\!\!\left[\!\!\begin{array}{c}O\\\|\\C\end{array}\!-\!Z\!-\!\begin{array}{c}O\\\|\\C\end{array}\!-\!O\!\right]_{\!\!q}\!\!H\right]_{\!m}\!\!\Big\}_{\!p},$$

$$[Tr]\!\!\!\!-\!\!\!\left\{\!NR^2\!\!\left[\!X'\!\!\left[\!\!O\!-\!\begin{array}{c}O\\\|\\C\end{array}\!-\!Y\!-\!\begin{array}{c}O\\\|\\C\end{array}\!-\!O\!-\!R\!\right]_{\!\!n}\right.\right.\quad\text{(II)}$$

$$-O\!\!\left[\!\!\begin{array}{c}O\\\|\\C\end{array}\!-\!Z\!-\!\begin{array}{c}O\\\|\\C\end{array}\!-\!O\!\right]_{\!\!q}\!\!H\right]_{\!m}\!\!\Big\}_{\!p},$$

$$[Tr]\!\!\!\!-\!\!\!\left\{\!A\!-\!X\!\!\left[\!\begin{array}{c}O\\\|\\C\end{array}\!\!\left[\!O\!-\!R'\!-\!\begin{array}{c}O\\\|\\C\end{array}\!\right]_{\!o}\!OH\right]_{\!m}\right\}_{\!p},\quad\text{(III)}$$

$$[Tr]\!\!\!\!-\!\!\!\left\{\!NR^2\!\!\left[\!X'\!\!\left[\!O\!-\!\begin{array}{c}O\\\|\\C\end{array}\!-\!R'\!\right]_{\!o}\!O\!\!\left[\!\begin{array}{c}O\\\|\\C\end{array}\!-\!Z\!-\!\begin{array}{c}O\\\|\\C\end{array}\!-\!O\!\right]_{\!q}\!H\right]_{\!m}\right\}_{\!p},\quad\text{(IV)}$$

in which formulae
tr is a radical of formula V or VI (V)  (VI)

A is —O— or —NR$^1$—, R$^1$ is hydrogen, unsubstituted or substituted C$_1$-C$_{20}$alkyl, C$_5$-C$_9$cycloalkyl, unsubstituted or substituted phenyl or C$_7$-C$_9$aralkyl, X is a di- or trifunctional radical of a hydroxycarboxylic or aminocarboxylic acid after removal of the functional groups, or A and X together are the radical of a heterocyclic aminocarboxylic acid after removal of the carboxylic group, which radical is attached to the radical Tr through the nitrogen atom, R$^2$, if m is 1, has one of the meanings of R$^1$, or R$^2$, if m is 2, is a free electron pair, R is the radical of an aliphatic, cycloaliphatic, aromtic, araliphatic or heterocyclic diol after removal of the two hydroxyl groups, which radical may carry substituents containing no active hydrogen atoms, Y is the radical of an aliphatic, cycloaliphatic, aromatic, araliphatic or heterocylic dicarboxylic acid after removal of the two carboxyl groups, which radical may carry substituents containing no active hydrogen atoms, Z has one of the meanings of Y, but may additionally also carry carboxylic acid or sulfonic acid radicals as substituents, R' is the divalent radical of an aliphatic, cycloaliphatic, aromatic or araliphatic hydroxycarboxylic acid after removal of the carboxyl group and the hydroxyl group, X' is the di-or trivalent radical of an aliphatic, cycloaliphatic, aromatic or araliphatic aminoalcohol after removal of the amino and the hydroxyl group or groups, n is an integer from 0 to 40, o is an integer from 1 to 40, m is 1 or 2, q is 0 or 1 and p, dependent on the radical Tr, is 3 or 4, M is a radical —W—Q—W—, wherein W is —O—, —NR$^1$— or —NR$^1$—X"—NR$^1$—OC—, X" is the divalent radical of an aliphatic, cycloaliphatic, aromatic or araliphatic diamine after removal of the amino groups, and Q is a divalent oligomer radical containing 1 to 60 monomers units, which radical is selected from the group consisting of 1,2-polybutadiene, 1,4-polybutadiene, acrylonitrile/butadiene copolymers, polyethers or polydialkylsiloxanes, with the proviso that if Tr is a radical of formula V, the groups R and R' may only be aliphatic or cycloaliphatic radicals, and that the compounds do not have a melting point above 200° C. and that at least one of n and q in formula II is greater than 0.

2. A compound of formula I, II, III or IV according to claim 1, wherein m is 1.

3. A compound of formula I or III according to claim 1, wherein A is —NR$^1$—.

4. A compound of formula I according to claim 1, wherein Tr is a radical of formula V, A is —NH—, X is —(CH$_2$)$_5$— and p is 3.

5. A compound of formula I or III according to claim 1, wherein A is —NR$^1$—, R$^1$ is hydrogen or C$_1$-C$_4$alkyl, X is C$_2$-C$_{20}$alkylene which is unsubstituted or substituted by C$_1$-C$_4$alkyl, C$_1$-C$_4$alkoxy or halogen, R is the radical of an aliphatic or cycloaliphatic diol after removal of the two hydroxyl groups, Y is the aromatic or heterocyclic radical of a dicarboxylic acid after removal of the two carboxyl groups, Z is the radical of an aromatic dicarboxylic acid or tricarboxycylic acid after removal of the carboxyl groups, R' is the divalent radical of an aliphatic or cycloaliphatic hydroxycarboxylic acid after removal of the functional groups, n is an integer from 0 to 10, o is an integer from 1 to 10, m is 1 and p is 3 or 4, W is —NR$^1$ or —NR$^1$—X"—NR$^1$—OC—, and X" is the radical of an aliphatic or cyloaliphatioc diamine after removal of the functional groups.

6. A compound of formula I or III according to claim 1, wherein A is —NH—, X is —(CH)$_r$—, r is an integer from 5 to 12, R is an aliphatic or cycloaliphatic radical of a diol after removal of the two hydroxyl groups, R' is the aliphatic radical of a hydroxycarboxylic acid after removal of the functional groups, Y is the aliphatic or aromatic radical of a dicarboxylic acid after removal of the two carboxyl groups, Z has one of the meanings of Y and may carry as substituent an additional carboxyl group, n is 0 to 4, o is 1 to 4 and m is 1.

7. A compound of formula I or II according to claim 1, wherein R is derived from ethylene glycol, propylene glycol, 1,4-butanediol, neopentyl glycol, 1,6-hexanediol, 1,12-dodecanediol, polyethylene glycol, polypropylene glycol, polybutylene glycol, polyhexamethylene glycol and 1,4-cyclohexanedimethanol and wherein Y is derived from succinic, glutaric, adipic, sebacic or azelaic acid and from dimeric fatty acids, phthalic acid, isophthalic acid or terephthalic acid, and wherein m is 1 and Z is derived from one of the dicarboxylic acids indicated in the definition of Y or from trimellitic acid or trimesic acid.

8. A compound of formula I according to claim 1, wherein Tr is a radical of formula V, A is —NH—, X is —(CH$_2$)$_r$—, r is an integer from 5 to 12, R is derived from a C$_2$–C$_6$ aliphatic diol or from polyethylene glycol, polypropylene glycol or polybutylene glycol containing 3 to 30 oxyalkylene units, Y is derived from succinic, adipic, sebacic or azelaic acid, Z has one of the meanings defined for Y or is derived from phthalic, isophthalic, terephthalic, trimellitic or trimesic acid, m is 1, p is 3 and n is an integer from 0 to 10.

9. A compound of formula I according to claim 1, wherein Tr is a radical of formula V, A is —NH—, X is —(CH$_2$)$_5$—, R is derived from 1,6-hexanediol, neopentyl glycol or from mixtures of both alcohols, Y is derived from terephthalic acid, Z is derived from trimellitic acid, m is 1, n is an integer from 1 to 10, and q is 1.

10. A process for the preparation of a compound of formula I according to claim 1, which process comprises reacting (a) the carboxylic acid of formula VII or VIII or a functionalised derivative thereof

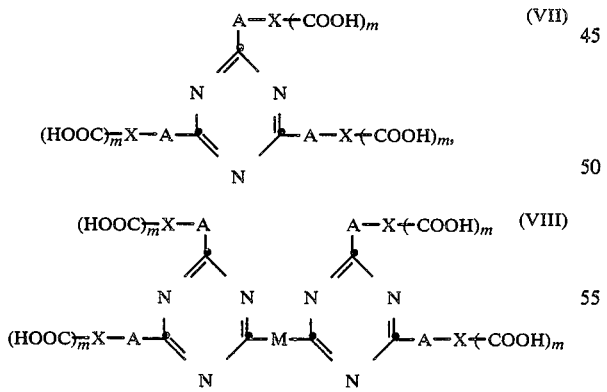

with (b), in th case of the carboxylic acid of formula VII, at least 3*m times the molar amount of the diol of formula IX, or, in the case of the carboxylic acid of formula VIII, at least 4*m times the molar amount of the diol of formula IX or of a functionalised derivative thereof

HO—R—OH     (IX)

and, if desired, with (c) the dicarboxylic acid of formula X or a functionalised derivative thereof

HOOC—Y—COOH     (X)

the radicals M, A, R, X and Y and the index m being as defined in claim 1.

11. A process for the preparation of a compound of formula I according to claim 1, wherein Z is a radical containing additional carboxylic acid or sulfonic acid radicals or Z is different from Y, which process comprises (a) preparing in accordance with the process of claim 10 a hydroxyl-terminated polyester and (b) subsequently further reacting said hydroxyl-terminated polyester with a di- or polycarboxylic acid of the formula HOOC—Z(COOH)$_b$ (b ≧ 1).

12. A process for the preparation of a carboxyl-terminated compound of formula I according to claim 1 which process comprises (a) preparing a hydroxyl-terminated polyester by esterification of transesterification, p1 (b) reacting said polyester with a half COOH equivalent of the compound of formula VII or VIII according to the process of claim 10 until the acid value of the reaction mixture is less than 5 mg KOH/g, and (c) if desired, reacting the remaining hydroxyl groups with the corresponding molar portion of a di- or tricarboxylic acid or of a functional derivative thereof until the acid value of the reaction mixture is less than 100 mg KOH/g.

13. A process for the preparation of a compound of formula III according to claim 1, which process comprises reacting (a) the carboxylic acid of formula VII or VIII of a functionalised derivative thereof

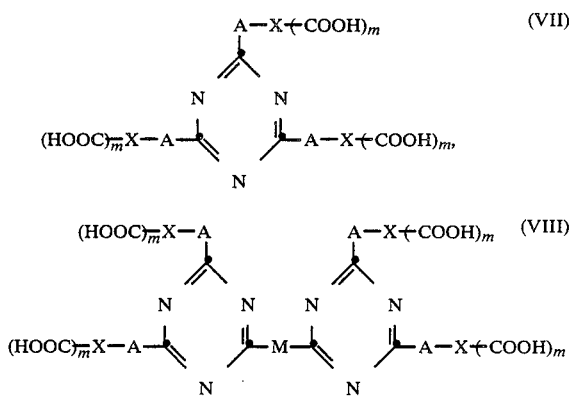

with (b), in the case of the carboxylic acid of formula VII or the corresponding functionalised derivative, at least 3*m times the molar amount of the hydroxycarboxylic acid of formula XI, or, in the case of the carboxylic acid of formula VIII or the corresponding functionalised derivative, at least 4*m times the molar amount of the hydroxycarboxylic acid of formula XI

HO—R'—COOH     (XI)

A, X, M and R' and the index m being as defined in claim 1.

14. A process for the preparation of a compound of formula II according to claim 1, which process comprises reacting
(a) a polyol of formula XII or XIII

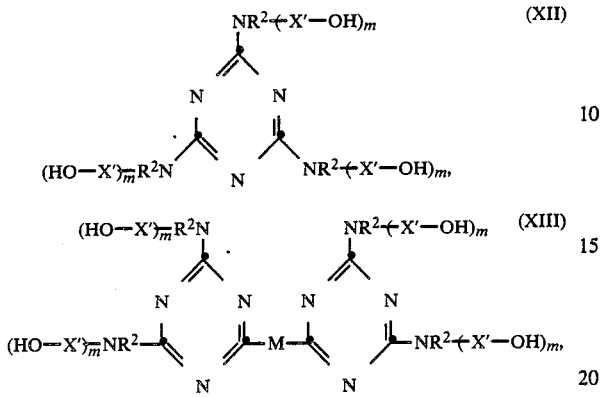

with (b), in the case of the polyol of formula XII, at least 3*m times the molar amount of the dicarboxylic acid of formula X, or, in the case of the polyol of formula XIII, at least 4*m times the molar amount of the dicarboxylic acid of formula X or of a fucntionalised derivative thereof

HOOC—Y—COOH     (X)

and optionally (c) with the diol of formula IX or a functionalised derivative thereof

HO—R—OH     (IX)

and, if desired, subsequently esterifying a hydroxyl-terminated reaction product wih the polycarboxylic acid HOOC—(COOH)$_b$(B≧1); the radicals M, X', R$^2$, R, Y and Z and the index m being as defined in claim 1.

15. A process for the preparation of a compound of formula IV according to claim 1, which process comprises reacting
(a) a polyol of formula XII or XIII

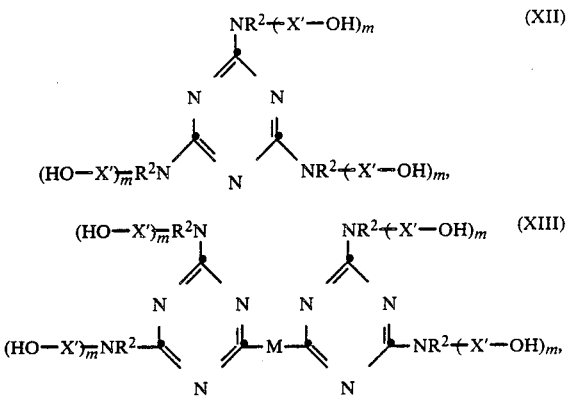

with (b), in the case of the polyol of formula XII, at least 3*m times the molar amount of the hydroxycarboxylic acid of formula XI, or, in the case of the polyol of formula XIII, at least 4*m times the molar amount of the hydroxycarboxylic acid of formula XI

HO—R'—COOH     (XI)

and, if desired, subsequently reacting the hydroxyl-terminated reaction product with the polycarboxylic acid HOOC—Z—(COOH)$_b$(b≧1); the radicals M, X', R$^2$, R' and Z and the index m being as defined in claim 1.

16. A composition which contains (a) a resin containing at least one 1,2-epoxide group in the molecule, and
(b) a compound of formula I, II, III or IV according to claim 1.

17. A hot melt adhesive containing as component a compound of formula I, II, III or IV according to claim 1.

18. A powder coating composition containing a carboxyl-terminated compound of formula I, II, III or IV according to claim 1.

19. A moulded article or coating, prepared by curing a composition according to claim 16.

20. A compound of formula I, II, III or IV

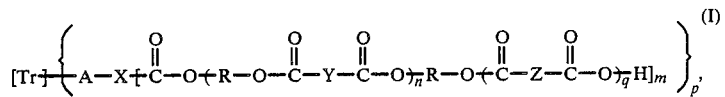

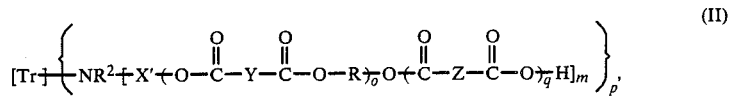

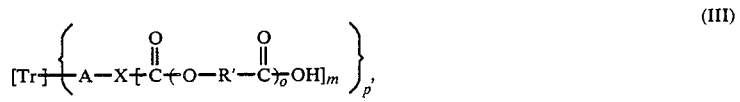

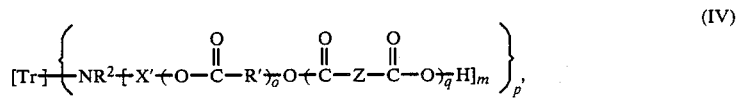

in which formulae
Tr is a radical of formula V or VI

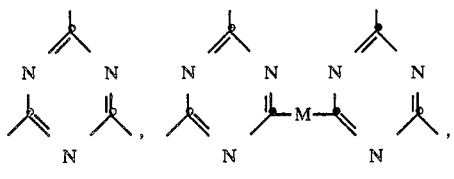

(V)   (VI)

A is —O— or —NR$^1$—, R$^1$ is hydrogen, unsubstituted or substituted $C_1$-$C_{20}$alkyl, $C_5$-$C_9$cycloalkyl, unsubstituted or substituted phenyl or $C_7$-$C_9$aralkyl, X is a di- or trifunctional radical of a hydroxycarboxylic or aminocarboxylic acid after removal of the functional groups, or A and X together are the radical of a heterocyclic aminocarboxylic acid after removal of the carboxylic group, which radical is attached to the radical Tr through the nitrogen atom, R$^2$ has one of the meanings of R$^1$, or R$^2$ is a free electron pair, R is the radical of an aliphatic, cycloaliphatic, aromatic, araliphatic or heterocyclic diol after removal of the two hydroxyl groups, which radical may carry substitutents containing no active hydrogen atoms, Y is the radical of an aliphatic, cycloaliphatic, aromatic, araliphatic or heterocyclic dicarboxylic acid after removal of the two carboxyl groups, which radical may carry substituents containing no active hydrogen atoms, Z has one of the meanings of Y, but may additionally also carry carboxylic acid or sulfonic acid radicals as substituents, R' is the divalent radical of an aliphatic, cycloaliphatic, aromatic or araliphatic hydroxycarboxylic acid after removal of the carboxyl group and the hydroxyl group, X' is the di- or trivalent radical of an aliphatic, cycloaliphatic, aromatic or araliphatic aminoalcohol after removal of the amino and the hydroxyl group or groups, n is an integer from 0 to 40, o is an integer from 1 to 40, m is 1 or 2, q is 0 or 1 and p, dependent on the radical Tr, is 3 or 4, M is a radical —W—Q—W—, wherein W is —O—, —NR$^1$— or —NR$^1$—X'—NR$^1$—OC—, X" is the divalent radical of an aliphatic, cycloaliphatic, aromatic or araliphatic diamine after removal of the amino groups, and Q is a divalent oligomer radical containing 1 to 60 monomer units, which radical is selected from the group consisting of 1,2-polybutadiene, 1,4polybutadiene, acrylonitrile/butadiene copolymers, polyethers or polydialkylsiloxanes, with the proviso that if Tr is a radical of formula V, the groups R and R' may only be aliphatic or cycloaliphatic radicals, and that the compounds do not have a melting point above 200° C. and that R$^2$ is only a free electron pair, if m is 2.

* * * * *